United States Patent
Naito et al.

[11] Patent Number: 5,929,390
[45] Date of Patent: Jul. 27, 1999

[54] LOAD CELL WEIGHING APPARATUS USING THE SAME

[75] Inventors: Kazufumi Naito; Takao Suzuki; Taro Hijikata, all of Shiga, Japan

[73] Assignee: Ishida Co., Ltd., Kyoto, Japan

[21] Appl. No.: 08/527,090

[22] Filed: Sep. 12, 1995

[30] Foreign Application Priority Data

Sep. 14, 1994 [JP] Japan .................................... 6-247303
Sep. 14, 1994 [JP] Japan .................................... 6-247304

[51] Int. Cl.⁶ ............................... G01G 3/14; G01G 3/08
[52] U.S. Cl. ................... 177/211; 177/229; 73/862.634; 73/862.627
[58] Field of Search .................... 177/211, 229, 177/184, 187; 73/862.627, 862.628, 862.629, 862.632, 862.633, 862.634

[56] References Cited

U.S. PATENT DOCUMENTS

| | | | |
|---|---|---|---|
| 4,197,611 | 4/1980 | Bell et al. | 16/116 R |
| 4,267,724 | 5/1981 | Spoor | 177/211 |
| 4,332,174 | 6/1982 | Suzuki et al. | 73/862.65 |
| 4,343,197 | 8/1982 | Suzuki et al. | 73/862.65 |
| 4,520,339 | 5/1985 | Utsunomiya | 177/211 |
| 4,545,446 | 10/1985 | Kokabu | 177/108 |
| 4,593,778 | 6/1986 | Konishi et al. | 177/187 X |
| 4,718,287 | 1/1988 | Mishliborsky | 177/211 |
| 4,747,456 | 5/1988 | Kitagawa et al. | 177/211 |
| 4,748,858 | 6/1988 | Ort | 73/862.63 |
| 4,802,540 | 2/1989 | Grabovac et al. | 177/211 |
| 4,821,822 | 4/1989 | Kitagawa et al. | 177/211 |
| 5,154,247 | 10/1992 | Nishimura et al. | 177/211 |
| 5,306,873 | 4/1994 | Suzuki et al. | 177/211 |
| 5,515,737 | 5/1996 | Imai et al. | 177/211 X |
| 5,551,385 | 9/1996 | Yoshida et al. | 123/184.21 |
| 5,604,336 | 2/1997 | Johnson | 177/229 |

FOREIGN PATENT DOCUMENTS

A-55 076 922  10/1980  Japan .
59-2332  1/1984  Japan .

*Primary Examiner*—Randy W. Gibson
*Attorney, Agent, or Firm*—Staas & Halsey

[57] ABSTRACT

A load cell includes a strain inducing element having a fixed rigid body fixedly secured to a base support, and a plurality of transverse beams spaced one above the other and connecting the fixed and movable rigid bodies together. Each of the transverse beams has first and second strain generating areas defined therein in spaced relation to each other at respective locations adjacent the fixed and movable rigid bodies. A bridge circuit for outputting a load signal of a magnitude proportional to strains generated at the strain generating areas includes strain gauges for detecting the strains generated at the strain generating areas, adjusting elements for adjusting a balance of the bridge circuit, and lines connecting them together. A circuit portion of the bridge circuit which includes at least the strain gauge and some of the lines is formed in a predetermined pattern on one surface of the strain inducing element so as to straddle between the first and second strain generating areas. Not only is the circuit portion symmetrical with respect to a point intermediate between the first and second strain generating areas, but also the strain inducing element has left and right portions, including the fixed and movable rigid bodies, which are symmetrical to each other.

8 Claims, 6 Drawing Sheets

LOAD CELL WEIGHING APPARATUS USING THE SAME

BACKGROUND OF THE INVENTION

1. Field of the Invention

The present invention relates to a load cell of a type wherein a bridge circuit having strain gauges is formed in a predetermined pattern on a surface of a strain inducing element and also to a weighing apparatus using such load cell.

2. Description of the Prior Art

A load cell employed in the prior art weighing apparatus generally comprises a strain inducing element for generating strain in response to a load applied thereto, a flexible wiring sheet such as, for example, a flexible printed circuit substrate and supported by the strain inducing element, and strain gauges fixedly bonded to the strain inducing element and having lead lines soldered to lines forming the flexible sheet to form a bridge circuit for detection of the strain. An example of this is disclosed in, for example, the Japanese Examined Patent Publication No. 59-2332 published in 1984.

On the other hand, in order to make the load cell compact, an attempt is made to form a thin-film bridge circuit on one surface of the stain inducing element by the use of an etching technique. However, where the thin-film bridge circuit is formed by the use of the etching, the following problems have been found.

Resistance elements of the strain gauges forming the bridge circuit are generally made of material having a relatively high resistance such as, for example, a copper-nickel alloy whereas the lead lines of the strain gauges and the lines bundled in the flexible sheet are made of a low resistance material such as gold. Therefore, where they are formed by the use of the thin-film technology, they are required to be etched separately, rendering the manufacturing process to be complicated.

On the other hand, in order to simplify the manufacturing process, it may be contemplated to make both of the strain gauges and the wiring lines of the same material such as, for example, a copper-nickel alloy so that the both can be etched during one process step. However, the use of the same material for the strain gauges and the wiring lines brought about an increase in resistance of the wiring lines. Once this occurs, not only the strain gauges, but also the wiring lines become susceptible to displacement of the strain inducing element and an error may occur in an output from the bridge circuit, with the consequence that the load cell will no longer provide a highly precise, accurate weighing result.

Also, since the strain inducing element is apt to deform with change in temperature, a pattern of distribution of temperature in the strain inducing element must be taken into consideration when a highly precise, accurate weighing result is desired.

By way of example, if an object to be weighed which is low in temperature, such as, for example, a frozen food product, is placed on the weighing table, the low temperature of the object is transmitted to the strain inducing element through the weighing table and, therefore, the temperature of one of the strain gauges adjacent one end of the strain inducing element, that is coupled with the weighing table, becomes different from that of the other of the strain gauges adjacent the opposite end of the strain inducing element, thereby creating a temperature gradient between the left and right strain gauges. Accordingly, where the temperature-dependent coefficient of resistance of the strain gauges is not zero, a change in resistance corresponding to the temperature gradient develops between the left and right strain gauges, accompanied by change in output of the bridge circuit to such an extent as to be unable to provide the highly precise, accurate weighing result.

Also, the Young's modulus of elasticity of one end of the strain inducing element increases with a decrease in temperature, accompanied by reduction in quantity of strain which leads to a weighing error.

SUMMARY OF THE INVENTION

The present invention has been developed to substantially eliminate the problems hereinabove discussed in connection with the prior art load cell and weighing apparatus and is intended to provide an improved load cell effective to simplify the manufacturing process and also to secure a highly precise, accurate weighing result.

To this end, a load cell according to one aspect of the present invention comprises a strain inducing element including a fixed rigid body, a movable rigid body to be loaded, a plurality of transverse beams connecting the fixed and movable rigid bodies together, and a bridge circuit. The fixed and movable rigid bodies are arranged in right and left. The plurality of the transverse beams are spaced one above the other. Each of the transverse beams has first and second strain generating areas defined therein in spaced relation to each other at respective locations adjacent the fixed and movable rigid bodies. The strain inducing element is of a shape symmetrical with respect to a mid-center plane dividing the strain inducing element into left and right halves. A bridge circuit outputs a load signal of a magnitude proportional to strains generated at the strain generating areas.

The bridge circuit referred to above includes strain gauges for detecting the strains generated at the strain generating areas, adjusting elements for adjusting a balance of the bridge circuit, and lines connecting them together. A circuit portion of the bridge circuit which includes at least the strain gauges and some of the lines is formed in a predetermined pattern on one surface of the strain inducing element so as to straddle between the first and second strain generating areas, the circuit portion being symmetrical with respect to a point intermediate between the first and second strain generating areas.

According to the foregoing aspect of the present invention, left and right portions of the circuit portion of the bridge circuit which includes the strain gauges and some of the wiring lines are so tailored as to be symmetrical to each other with respect to a point intermediate between the left and right strain generating areas adjacent the fixed and movable rigid bodies, respectively. Accordingly, where the etching technique is employed to pattern the circuit portion, a difference in dimension between left and right circuit patterns including the strain gauges can be conveniently minimized enough to minimize a difference in resistance between the left and right strain gauges and also between the wiring lines.

Also, since the strain inducing element has left and right portions which are symmetrical to each other, that is, the strain inducing element is of a symmetrical configuration, and, also, since the circuit portion of the bridge circuit is of a symmetrical design as hereinabove described, a uniform pattern of distribution of heat evolved by the left and right strain gauges can be obtained.

This effect is particularly dominant where the same material is employed for the strain gauges and the wiring lines for the purpose of simplifying the manufacturing process. Therefore, even though the resistance of the wiring lines increases for the reason discussed above, minimization of the error between the left and right portions is effective to render a change in resistance occurring in the left portion incident to displacement of the strain inducing element and that occurring in the right portion incident to displacement of the strain inducing element to be uniform. Accordingly, the output error of the bridge circuit can be minimized advantageously.

According to another aspect of the present invention, the load cell comprises a strain inducing element including a fixed rigid body, a movable rigid body to be loaded, a plurality of transverse beams spaced one above the other and connecting the fixed and movable rigid bodies together, each of the transverse beams having first and second strain generating areas defined therein in spaced relation to each other at respective locations adjacent the fixed and movable rigid bodies; and a bridge circuit for outputting a load signal of a magnitude proportional to strains generated at the strain generating areas.

The bridge circuit includes strain gauges for detecting the strains generated at the strain generating areas, adjusting elements for adjusting a balance of the bridge circuit, and lines connecting them together. A circuit portion of the bridge circuit which includes at least the strain gauge and some of the lines is formed in a predetermined pattern on one surface of the strain inducing element so as to straddle between the first and second strain generating areas. A flexible wiring ribbon is used to form a non-patterned portion of the bridge circuit, which is not formed on such surface of the strain inducing element, and lines to connect the bridge circuit with an external circuit.

This flexible wiring ribbon has first and second connecting ends opposite to each other and the first connecting end of the flexible wiring ribbon is connected with a patterned portion of the bridge circuit, which is formed on such surface of the strain inducing element, at a location generally intermediate between the first and second strain generating areas, whereas the second connecting end of the flexible wiring ribbon is adapted to be connected with the external circuit. A portion of the flexible wiring ribbon generally intermediate between the first and second connecting ends thereof is supported by the fixed rigid body of the strain inducing element.

According to such another aspect of the present invention, the connecting end of the flexible wiring ribbon with the patterned portion of the bridge circuit is provided at a position intermediate between the left and right strain inducing areas and, therefore, the bridge circuit can have a symmetry in structure. Also, since no line connecting the strain gauges and the connecting end of the flexible wiring ribbon extends across the strain generating areas, the flexible wiring ribbon will be adversely affected neither by the strain induced in the strain inducing element, but also by any limitation in space and, therefore, the flexible wiring ribbon may have an increased width.

In addition, since the intermediate portion of the flexible wiring ribbon positioned generally intermediate between the connecting end thereof with the patterned portion of the bridge circuit and the opposite connecting end thereof with the external circuit is fixedly supported by the fixed rigid body forming a part of the strain inducing element, no stress build-up occurs at the connecting end of the flexible wiring ribbon with the patterned portion of the bridge circuit and the output of the bridge circuit will not therefore be affected adversely.

Preferably, the adjusting elements in the bridge circuit are formed in a predetermined pattern on the surface of the strain inducing element together with the strain gauges.

According to a certain preferred embodiment of the present invention, a Young's temperature compensating element for compensating for change in Young's modulus of elasticity of the strain inducing element with change in temperature and/or zero-point temperature compensating elements for compensating for change in zero-point of the bridge circuit with change in temperature are preferably disposed at respective locations adjacent said intermediate point and connected with the flexible wiring ribbon.

Where the Young's temperature compensating element and/or the zero-point temperature compensating elements are so disposed at respective locations adjacent said intermediate point as described above, even though a difference in temperature develops between the left and right portions of the strain inducing element, a temperature compensation can be accomplished on the basis of an average temperature of the left and right portions of the strain inducing element and, therefore, the accuracy with which this temperature compensation is accomplished is highly advantageous.

According to a different embodiment of the present invention, the circuit portion of the bridge circuit which includes at least said strain gauge and some of the lines is formed in a predetermined pattern on each of top and bottom surfaces of the strain inducing element to thereby render the load cell to be of a so-called double-sided gauge system.

With the load cell of the double-sided gauge system, the tensile strain gauges and the compressive strain gauges paired on either end of the load cell are positioned one above the other in alignment with each other. Therefore, even though a difference in temperature develops between the opposite ends of the load cell, the tensile and compressive strain gauges attain the same temperature sufficient to exhibit a substantially identical change in resistance and the bridge circuit can therefore be maintained in a state of equilibrium, resulting in a highly precise, accurate weighing result.

According to a further preferred embodiment of the present invention, a heat insulating material is interposed between the fixed rigid body and the base support and also between the movable rigid body and the weighing table. The use of the heat insulating pads is effective to avoid thermal conduction from the weighing table and/or the base support to the strain inducing element. Therefore, an uneven distribution of temperature in the strain inducing element resulting from the temperature difference between the strain inducing element and one or both of the weighing table and the base support can advantageously be suppressed. Also, since heat evolved in the strain inducing element as a result of heating of the strain gauges does not flow from and to the outside, a distribution of the temperature inside the strain inducing element brought about by said heat is rendered symmetrical with respect to left and right portions of the strain inducing element. Accordingly, a reduction in weighing preciseness which would be brought about by the change in temperature can be minimized.

The present invention also provides a weighing apparatus which makes use of the load cell of a type referred to above. Specifically, the weighing apparatus herein provided comprises, in addition to the load cell referred to above, a base support for supporting the fixed rigid body of the load cell, and a weighing table coupled with the movable rigid body of the load cell for supporting thereon an object to be weighed.

BRIEF DESCRIPTION OF THE DRAWINGS

In any event, the present invention will become more clearly understand from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

DETAILED DESCRIPTION OF THE EMBODIMENTS

Figure 1:
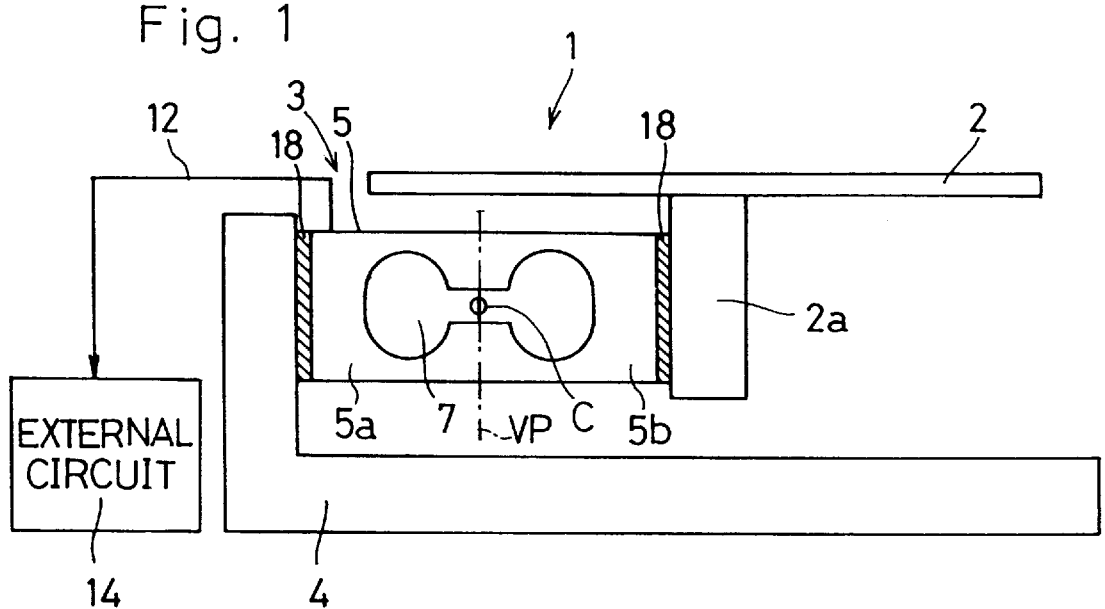
FIG. 1 is a schematic side view of a weighing apparatus utilizing a load cell according to a first preferred embodiment of the present invention.

Referring first to FIG. 1, a weighing apparatus 1 according to a first preferred embodiment of the present invention shown therein comprises a support table 2 for the support thereon of an object to be weighed, a load cell 3 operable when loaded by the object placed on the support table 2 to generate a strain of a magnitude proportional to the weight of the object and then to output a load signal, a support base 4 for the support thereon of the load cell 3, and an external circuit (including a signal processor and an electric power circuit) 14 for processing the load signal supplied from the load cell 3 to provide a weight signal indicative of the weight of the object placed on the support table 2.

As shown in a schematic perspective representation in FIG. 2, the load cell 3 referred to above comprises a strain inducing element 5 of a generally rectangular configuration made of an aluminum alloy or stainless steel and capable of generating a strain of a magnitude proportional to the weight of the object placed on the support table 2, a circuit component 8a forming a part of a bridge circuit 8, as will be described later, which is patterned, i.e., formed in a predetermined pattern, on, for example, a top surface of the strain inducing element 5, and a flexible wiring ribbon 12 such as, for example, a flexible printed circuit (FPC) substrate including a plurality of conductors 19 and used to connect a non-patterned portion of the bridge circuit 8 with the external circuit (including the signal processor and the electric power circuit) 14. The flexible wiring ribbon 12 has a connection 13 at one end thereof which is soldered to the circuit component 8a of the patterned bridge circuit 8 as will be described later, and also has at the opposite end a connection 17 such as, for example, a connector which is in turn connected with the external circuit 14. A generally intermediate portion 15 of the flexible wiring ribbon 12 between the opposite connections 13 and 17 is secured by the use of a suitable fixing means such as, for example, a double-sided adhesive tape, to an upper surface U and a side surface S of a fixed rigid body 5a of the strain inducing element 5.

The strain inducing element 5 is of a generally elongated configuration and comprises, in addition to the fixed rigid body 5a fixedly connected with an upright arm of the base support 4, a movable rigid body 5b fixedly coupled with the weighing table 2 through a downwardly extending stem 2a of the weighing table 2, and upper and lower traverse beams 5c and 5d connecting the fixed and movable rigid bodies 5a and 5b together and spaced a predetermined distance from each other so as to extend parallel to each other to thereby leave a generally rectangular hollow 7 in cooperation with the fixed and movable rigid bodies 5a and 5b. Opposite end portions of each of the upper and lower transverse beams 5c and 5d adjacent the fixed and movable rigid bodies 5a and 5b which confront the hollow 7 are inwardly notched at 9 inwardly from the hollow 7 to thereby define respective constricted wall areas in the associated transverse beam 5c and 5d, said constricted wall areas in the fixed and movable rigid bodies 5a and 5c serving as strain generating areas 6 of the strain inducing element 5.

The strain inducing element 5 of the above described construction is symmetrical in shape with respect to a mid center plane VP dividing each of the upper and lower transverse beams 5c and 5d into equal halves as shown in FIG. 1 and also with respect to a center point C lying intermediate not only between the fixed and movable rigid bodies 5a and 5b, but also between the upper and lower transverse beams 5c and 5d.

A heat insulating pad 18 is interposed between the fixed rigid body 5a and the upright arm of the base support 4 and also between the movable rigid body 5b and the stem 2a of the weighing table 2. The heat insulating pad 18 is, since the strain inducing element 5 is made of an aluminum alloy or stainless steel as described previously, made of insulating material of a kind having a thermal conductivity not higher than kcal/m.h. °C., preferably not higher than 0.1 kcal/m.h. °C. and more preferably not higher than 0.05 kcal/m.h. °C. Examples of the heat insulating material which may be employed for the heat insulating pads 18 include bakelite (phenol resin) and any other suitable synthetic resin.

Figure 3:
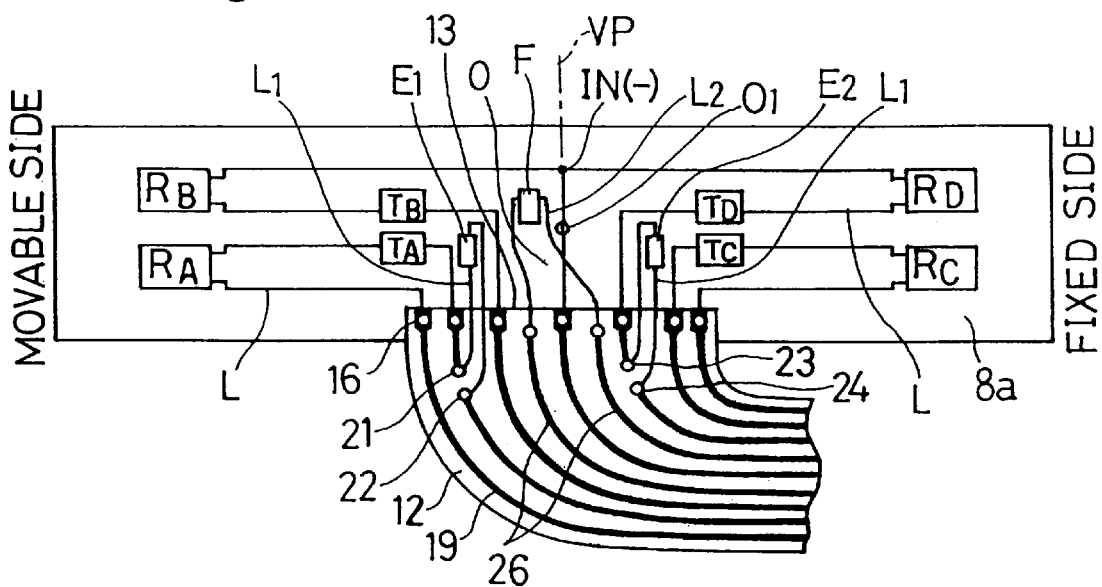
FIG. 3 is a top plan view, on an enlarged scale, showing a bridge circuit patterned on a top surface of a strain inducing element forming a part of the load cell shown in FIG. 1.

As shown in a plane representation in FIG. 3, the bridge circuit 8 includes first and second compressive strain gauges RA and RB for detecting strains generated at the strain generating areas 6 in the upper and lower transverse beams 5c and 5d adjacent the fixed rigid body 5a; third and fourth tensile strain gauges RC and RD for detecting strains generated at the strain generating areas 6 in the upper and lower transverse beams 5c and 5d adjacent the movable rigid body 5b; bridge balance adjusting resistors TA, TB, TC and TD which are an adjustment element for adjusting an output from the bridge circuit 8; and zero-point temperature compensating elements E1 and E2 such as, for example, temperature sensitive resistors for compensating for change of the zero-point of the bridge circuit 8 which would occur with change in temperature; and connecting conductors or connecting lines L connecting those elements to complete the bridge circuit 8. The first to fourth strain gauges RA, RB, RC and RD are connected in series with the associated bridge balance adjusting resistors TA, TB, TC and TD to thereby form four respective sides of the bridge circuit 8. The zero-point temperature compensating elements E1 and E2 are inserted in the respective two sides of the bridge circuit 8 which are connected together at a positive output terminal OUT(+) (or maybe a negative output terminal OUT(−)). Alternatively, they may be inserted in one of two sides of the bridge circuit 8 connected with the positive output terminal OUT(+) and one of two sides thereof confronting the above mentioned one side and connected with the negative output terminal OUT(−), respectively.

The circuit component 8a of the bridge circuit 8 refered to above includes the first to fourth strain gauges RA, RB, RC and RD, the bridge balance adjusting resistors TA, TB, TC and TD and some of the connecting conductors L, that is, series-connecting conductors used to connect the first to fourth strain gauges RA, RB, RC and RD in series with the associated bridge balance adjusting resistors TA, TB, TC and TD. This circuit component 8a is printed in the predetermined pattern on the top surface of the strain inducing element 5 by the use of a known photo-printing technique or a photo-etching technique so as to straddle the strain generating areas 6 in the upper transverse beam 5c, with the first and second strain gauges RA and RB and the third and fourth strain gauges RC and RD positioned immediately above the respective strain generating areas 6 in the upper transverse beam 5c.

As can readily be understood from FIG. 3, the first to fourth strain gauges RA, RB, RC and RD, the bridge balance adjusting resistors TA, TB, TC and TD, and the series-connecting conductors L, all forming the circuit component 8a of the bridge circuit 8, are positioned and laid symmetrical with respect to a center point O1 intermediate between the strain generating areas 6 in the upper transverse beam 5c.

Other lines of the bridge circuit 8 than the patterned circuit component 8a are formed in the flexible wiring ribbon 12 as hereinbefore described. The zero-point temperature compensating elements E1 and E2 are not patterned, but are mounted as separate component parts on the top surface of the upper transverse beam 5c at a central portion O of the bridge circuit 8 adjacent the center point O1. The zero-point temperature compensating element E1 has its opposite ends connected through a lead line L1 with respective connecting terminals 21 and 22 formed in the flexible wiring ribbon 12 and, on the other hand, the zero-point temperature compensating element E2 has its opposite ends connected through another lead line L1 with respective connecting terminals 23 and 24 formed in the flexible wiring ribbon 12. A Young's modulus temperature compensating element F such as, for example, a temperature sensitive resistor for compensating for change of the Young's modulus of elasticity of the strain inducing element 5 which would occur with change in temperature is, without being patterned, mounted as a separate component part on the top surface of the upper transverse beam 5c at the central portion O of the bridge circuit 8 and is electrically connected through a lead line L2 with a line 26 formed in the flexible wiring ribbon 12. The patterned circuit component 8a of the bridge circuit 8 together with the zero-point temperature compensating elements E1 and E2 and the Young's modulus temperature compensating element F is covered by a protective layer 10 of synthetic resin such as, for example, silicone for protecting them from influenced by external stresses.

Figure 4:
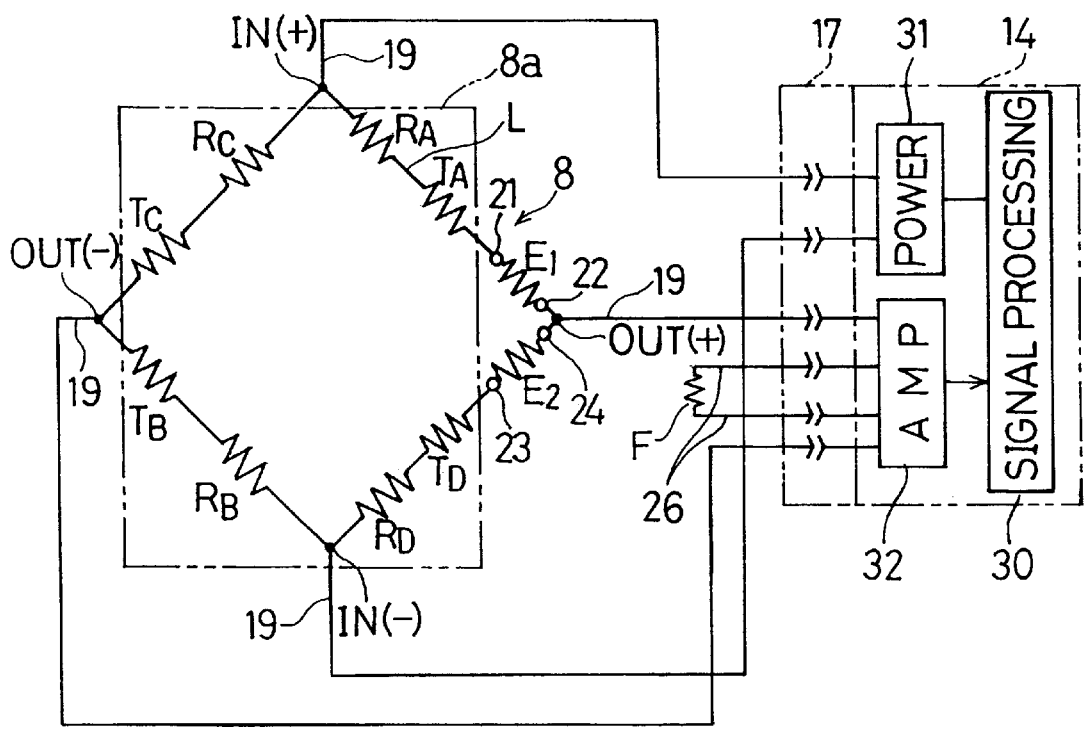
FIG. 4 is a circuit diagram showing the bridge circuit employed in the load cell shown in FIG. 1.

Referring particularly to FIG. 4, the external circuit 14 includes the signal processing circuit 30, the electric power circuit 31 and an amplifier 32. The electric power circuit 31 is electrically connected through lines 19 with positive and negative input terminals IN(+) and IN(−) of the bridge circuit 8 to apply an input voltage thereto. A voltage between the positive and negative output terminals OUT(+) and OUT(−) of the bridge circuit 8 is supplied to the signal processing circuit 30 through the amplifier 32 as a load signal generated from the load cell 3. The Young's modulus temperature compensating element F is connected through lines 26 with the amplifier 32. The amplifier 32 is so designed as to process the load signal to compensate for temperature-dependent change in Young's modulus and the signal processing circuit 30 fed from the amplifier 32 subsequently provides the load signal indicative of the weight of the object placed on the weighing table 2. It is to be noted that the positive and negative input terminal IN(+) and the positive and negative output terminals OUT(+) and OUT(−) of the bridge circuit 8 are formed in and positioned within the flexible wiring ribbon 12 whereas the negative input terminal IN(−) of the bridge circuit 8 is formed in and positioned within the circuit component 8a.

In the construction so far described above, a group of the first and second strain gauges RA and RB, the bridge balance adjusting resistors TA and TB and some of the connecting conductors L and a group of the third and fourth strain gauges RC and RD, the bridge balance adjusting resistors TC and TD and the rest of the connecting conductors L, all forming the circuit component 8a of the bridge circuit 8, are positioned symmetric to each other with respect to the center point O1 which is a point intermediate between the strain generating areas 6 in the upper transverse beam 5c. This means that, when a wet etching is to be carried out using a mask during the formation of the circuit component 8a, the mask may have symmetrical patterns complemental to the circuit layout of the circuit component 8a wherefore the quantity of material etched off during the execution of the wet etching can be uniform over the symmetrically patterned mask, resulting in formation of uniform dimensions of the strain gauge pairs, that is, uniform resistances. Accordingly, the first to fourth strain gauges RA to RD can evolve an equal quantity of heat to accomplish a thermal balance sufficient to provide the accurate load signal with minimized temperature-dependent error.

Moreover, since the strain inducing element 5 is of a symmetrical configuration with respect to the mid center plane VP and, also, since the circuit component 8a of the bridge circuit 8 is of a symmetrical layout with respect to the center point O1, a pattern of distribution of heat evolved by the first and second strain gauges RA and RB and that evolved by the third and fourth strain gauges RC and RD are rendered to be generally symmetrical to each other. Accordingly, not only are a temperature distribution of the first and second strain gauges RA and RB and that of the third and fourth strain gauges RC and RD generally symmetrical to each other, but a temperature distribution of some of the connecting conductors L is also generally symmetrical to each other and, therefore, the highly accurate load signal can be obtained.

Where the first to fourth strain gauges RA to RD and the connector conductors L are made of the same material such as, for example, a copper-nickel alloy which has a relatively high resistance, one and the same process step may be employed to accomplish etching, resulting in increase of the productivity. In such case, since the thickness generally remains the same, the connecting conductors L are tailored to have a relatively large width so as to have a low resistance. In the practice of the present invention, however, the load cell, as well as the connecting conductors L, is of a symmetrical configuration as hereinbefore described and, therefore, left and right portions of the respective resistances of the connecting conductors L can be balanced. Thus, the bridge circuit 8 capable of giving a minimized output error can be formed by a thin-film technology with the manufacturing process simplified concomitantly.

Since as hereinabove discussed left and right portions of the circuit component 8a of the bridge circuit 8 are tailored so as to be symmetrical to each other, the connection 13 between the circuit component 8a of the bridge circuit 8 and the flexible wiring ribbon 12 is disposed at the central portion O intermediate between the strain generating areas 6 in the upper transverse beam 5c as shown in FIG. 3 so that, while securing the symmetry of the circuit component 8a of the bridge circuit 8, an output from the bridge circuit 8 may be substantially free from any error. As a result of this, the following advantages can be appreciated.

By way of example, where the connection 13 is disposed on either a left end portion of the strain inducing element 5 (where the fixed rigid body 5a occupies) or a right end portion of the strain inducing element 5 (where the movable rigid body 5b occupies) in a manner contrary to the present invention, the connecting conductors L have to extend to the left or right end portion of the strain inducing element 5 having detoured around the strain gauges RA to RD and may therefore extend across the strain generating areas 6 in the upper transverse beam 5c. In such case, not only is the connecting conductors L apt to be affected by the strain induced in the strain inducing element 5, but also they must pass through a limited space laterally of the strain gauges RA to RD, and, therefore, the connecting conductors L cannot have an increased width.

In contrast thereto, where the connection 13 is disposed at the central portion O such as accomplished in the present invention as hereinbefore described, the connecting conductors L do not pass around the strain gauges RA to RD and are therefore immune to the influence which may be brought about by the strain induced in the strain inducing element 5 and also to any limitation in space which may be brought about by the strain gauges and, therefore, they can advantageously have an increased width.

Furthermore, the provision of the heat inducing pads 18 between the upright arm of the base support 4 of the weighing apparatus 1 and the fixed rigid body 5a and between the movable rigid body 5b and the stem 2a of the weighing table 2 is effective to minimize heat conduction to the strain inducing element 5.

More specifically, if an object to be weighed which is low in temperature, such as, for example, a frozen food product, is placed on the weighing table 2, the low temperature of the object may be transmitted to the strain inducing element 5 through the weighing table 2. This possibility is eliminated by the use of the heat insulating pad 18 which provides heat insulation between the movable rigid body 5b and the stem 2a of the weighing table 2. Similarly, a heat conduction from the base support 4 to the fixed rigid body 5a is minimized by the heat insulating pad 18 provided therebetween.

Consequently, uneven distribution of the temperature in the strain inducing element 5 resulting from a difference in temperature between the strain inducing element 5 and one or both of the weighing table 2 and the base support 4 is conveniently suppressed and, hence, no temperature difference is created between a pair of the strain gauges RA and RB adjacent the movable rigid body 5b and a pair of the strain gauges RC and RD adjacent the fixed rigid body 5a as shown in FIG. 3. This means that even though each of the strain gauges RA to RD is of a type having a temperature-dependent coefficient of resistance (TCR) which is not zero, a change in resistance in the strain gauges RA to RD is suppressed. Also, no considerable temperature difference occurs between left and right lines of the wiring conductors L. Accordingly, any possible reduction in weighing accuracy which would otherwise result from the temperature difference between the strain inducing element 5 and one or both of the weighing table 2 and the base support 4 can be suppressed advantageously.

Figure 2:
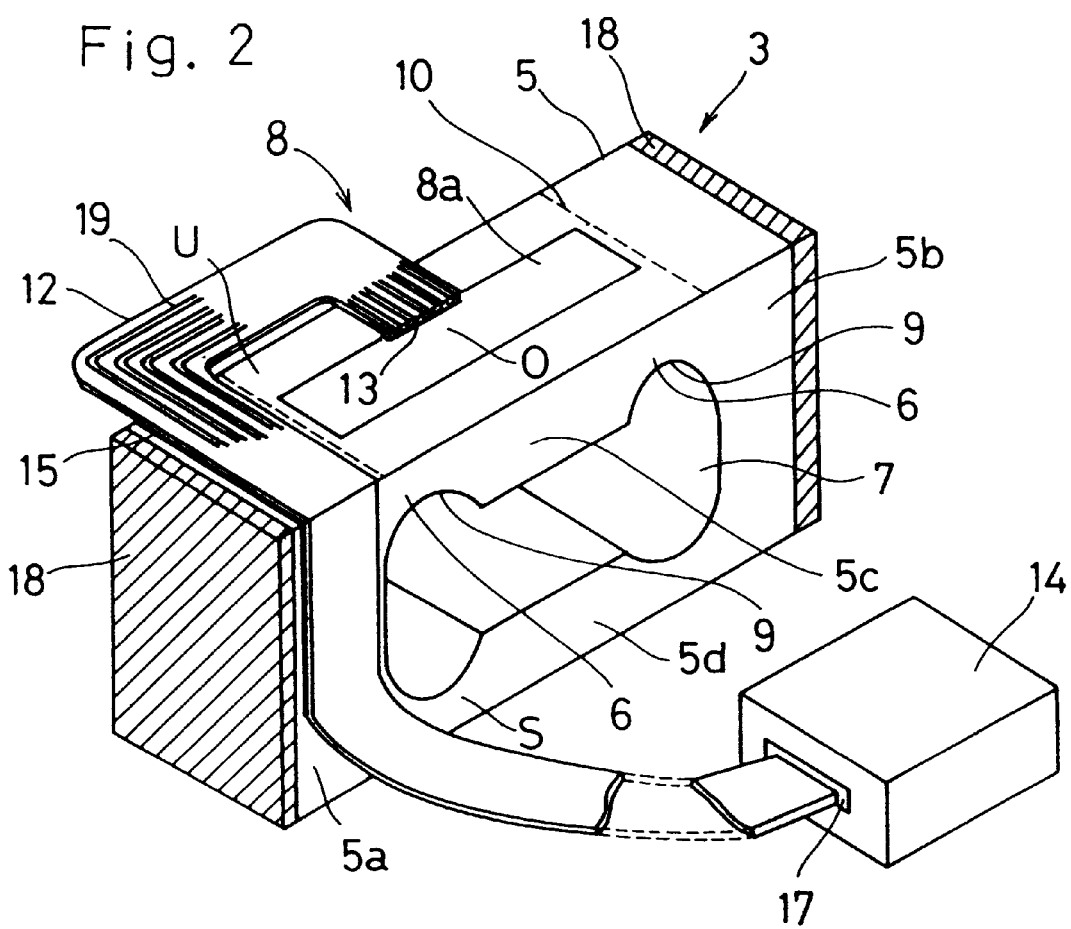
FIG. 2 is a perspective view of the load cell shown in FIG. 1.

Similarly, since no great temperature difference is created between the left and right portions of the strain inducing element 5 shown in FIG. 2 adjacent the fixed and movable solid bodies 5a and 5b, respectively, with the Young's modulus of elasticity thereof being equal at a predetermined value and, thus, the amount of the strain remains equal enough to render the load signal to give an equal level, the output from the bridge circuit 8 does not vary and, therefore, the weighing accuracy can be secured.

Also, it is often observed that at the start of weighing the strain gauges RA to RD evolve heat accompanied by change in resistance of the strain gauges RA to RD, resulting in a change (known as a power-on drift) of the output from the bridge circuit 8. The heat evolved by the strain gauges RA to RD has hitherto been allowed to flow between the base support 4 and the outside through the weighing table 2, making it difficult to stabilize the temperature and, therefore, the power-on drift does not converge quickly. In view of this, in the weighing apparatus 1 embodying the present invention, the heat insulating pads 18 are employed as hereinbefore described to substantially eliminate or minimize the flow of the heat, evolved from the strain gauges RA to RD, between them and the outside to thereby facilitate stabilization of the temperature at a predetermined value. For this reason, according to the present invention, the power-on drift can quickly converge to facilitate a weighing of the object to be weighed immediately after power-on of the weighing apparatus 1. In particular, since the left and right portions of the strain inducing element 5 is symmetrical to each other and, therefore, increase of the temperature of the strain inducing element 1 as a result of heating of the strain gauges RA to RD takes place symmetrically with respect to the left and right portions of the strain inducing element 5, a highly accurate weighing signal can be obtained from the bridge circuit 8 even if the weighing operation is initiated before the temperature is stabilized.

Moreover, consequent upon a temperature cycle test in which the output from the bridge circuit 8 is measured by causing the outside temperature, i.e., the temperature of the environment in which the weighing apparatus 1 is placed, to fluctuate by a predetermined value up and down with respect to a predetermined temperature, it has been ascertained that the temperature-dependent hysteresis of the output value of the bridge circuit 8 exhibited at 20° C. when the outside temperature was changed upwardly from 10° C. to 20° C. and then from 20° C. to 30° C. and subsequently downwardly from 30° C. to 20° C. and then from 20° C. to 10° C. was small as compared with that exhibited by the prior art weighing apparatus. This accounts that the use of the heat insulating pads 18 is effective to minimize the temperature-dependent hysteresis of the zero-point.

The flexible wiring ribbon 12 is formed with through-holes 16 and the lead lines 19 bundled in the flexible wiring ribbon 12 and the circuit component 8a of the bridge circuit 8 are connected together through those through-holes 16. In other words, by dropping a melted solder through the through-holes 16 onto line terminals of the circuit component 8a of the bridge circuit 8 which are then positioned immediately below the respective through-holes 16, the lead lines 19 of the flexible wiring ribbon 12 are soldered with the line terminals of the circuit component 8a of the bridge circuit 8. Because of this, there is no possibility that an insulating film of the circuit component 8a of the bridge circuit 8 may be damaged in contact with a heated solder iron and, thus, the formation of the through-holes 16 in the flexible wiring ribbon 12 is advantageous in that an accurate and reliable soldering is possible with no possibility of failure in electrical isolation.

In the meantime, it may occur that any displacement in position of the flexible wiring ribbon 12 and/or a change in position of the flexible wiring ribbon 12 as a result of displacement of the strain inducing element 5, both of which may occur when the flexible wiring ribbon 12 is fitted to the strain inducing element 5 after the circuit component 8a of the bridge circuit 8 has been electrically connected with the external circuit 14 through the flexible wiring ribbon 12 and a required circuit adjustment has subsequently been carried out, would result in application of a restraint force to the strain inducing element 1 accompanied by variation in output from the bridge circuit 8.

In order to avoid the change in resistance of the lines 19 and 26 discussed above, the generally intermediate portion 15 of the flexible wiring ribbon 12 between the connection 13 of the flexible wiring ribbon 12 and the opposite connection 17 thereof for electric connection with the external circuit 14 is, by the use of the suitable fixing means such as, for example, a double-sided adhesive tape, secured to and therefore supported by the upper surface U and the side surface of the fixed rigid body 5a of the strain inducing element 5 as hereinbefore described.

By securing the connection 13 and the intermediate portion 15 of the flexible wiring ribbon 12 to the strain inducing element 5 in the manner as herein-before described, the stress which would be set up at the connection 13 incident to up and down movement of the flexible wiring ribbon 12 resulting from the displacement of the flexible wiring ribbon 12 that may take place at the time of attachment of the flexible wiring ribbon 12 to the strain inducing element 5 or up and down displacement of the movable rigid body 5b of the strain inducing element 5, can be minimized as compared with the case in which the other end of the flexible wiring ribbon 12 is connected directly to the external circuit 14 and, therefore, any possible error occurring in the output from the bridge circuit 8 can be minimized. Also, since the flexible wiring ribbon 12 is pliable and yieldable, it does not affect the displacement of the strain inducing element 5 during the actual weighing operation and, therefore, the flexible wiring ribbon 12 can advantageously be employed in association with a low capacity, highly precise load cell 3 capable of weighing objects to be weighed in minimum scale of 10 mg.

Figure 5:
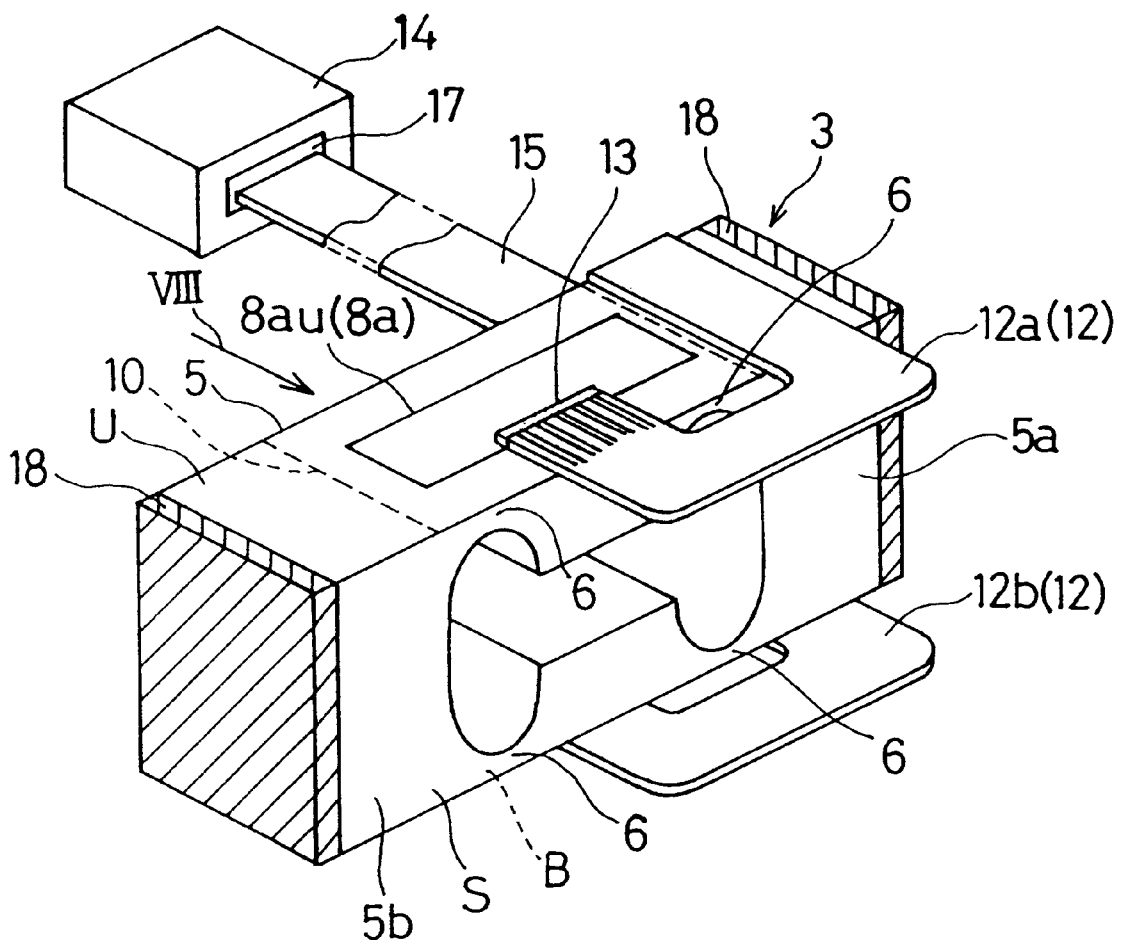
FIG. 5 is a perspective view of the load cell according to a second preferred embodiment of the present invention.

A second preferred embodiment of the present invention is shown in FIG. 5. In this second preferred embodiment, substantially equal halves of the circuit component 8a, including the strain gauges, of the bridge circuit 8 are patterned on the top and bottom surfaces U and B of the strain inducing element 5, respectively. This type may be referred to as a load cell of a double-sided gauge system.

Figure 6A:
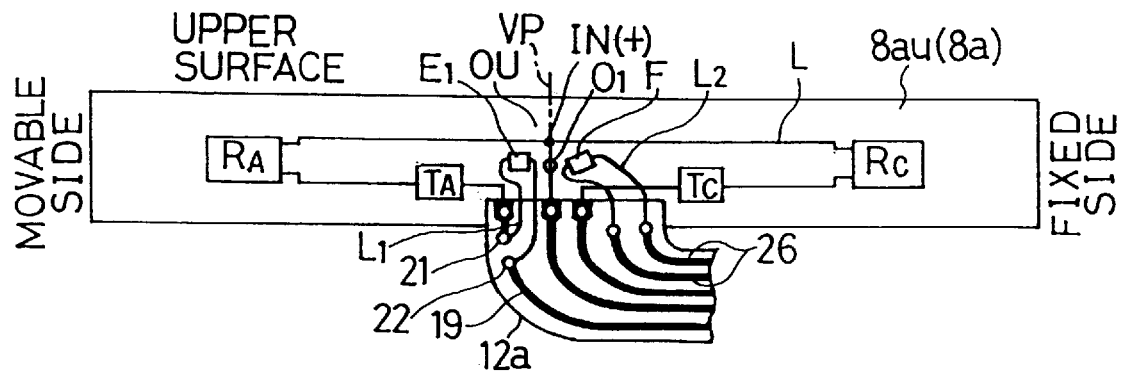
FIG. 6A is a top plan view, on an enlarged scale, showing a first bridge circuit patterned on the top surface of the strain inducing element forming a part of the load cell shown in FIG. 5.

More specifically, as shown in FIG. 6A, a circuit portion 8au of the circuit component 8a which includes the first and third strain gauges RA and RC for detecting strains generated in the respective strain generating areas 6 in the upper transverse beam 5c of the strain inducing element 5, the bridge balance adjusting resistors TA and TC and some of the connecting conductors L used to connect the first and third strain gauges RA and RC and the bridge balance adjusting resistors TA and TC is formed in a predetermined pattern on the top surface U of the strain inducing element 5 by the use of any known photo-printing technique so as to straddle between the strain generating areas 6 in the upper transverse beam 5c. The first and third stain gauges RA and RC so formed occupy respective positions immediately above the associated strain generating areas 6 in the upper transverse beam 5c.

Figure 6B:
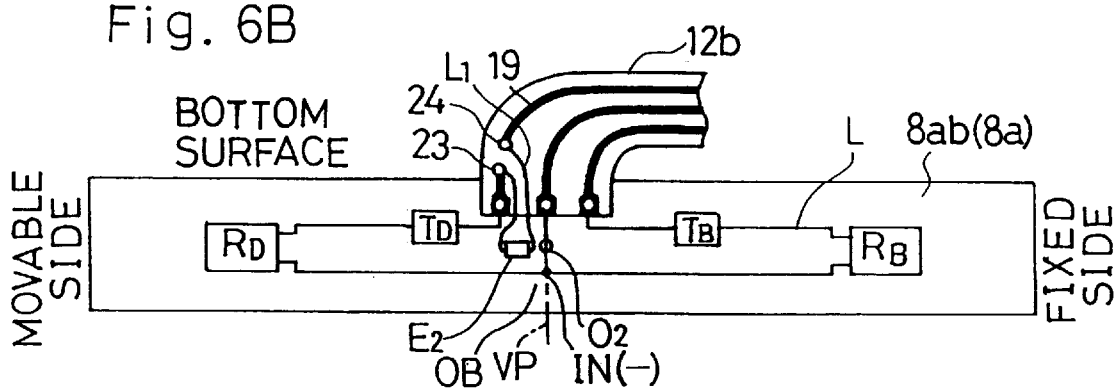
FIG. 6B is a bottom plan view, on an enlarged scale, showing a second bridge circuit patterned on a bottom surface of the strain inducing element forming that part of the load cell shown in FIG. 5.

Similarly, as shown in FIG. 6B, a circuit portion 8ab of the circuit component 8a which includes the second and fourth strain gauges RB and RD for detecting strains generated in the respective strain generating areas 6 in the lower transverse beam 5d of the strain inducing element 5, the bridge balance adjusting resistors TB and TD and some of the connecting conductors L used to connect the second and fourth strain gauges RB and RD and the bridge balance adjusting resistors TB and TD is formed in a predetermined pattern on the bottom surface B of the strain inducing element 5 by the use of any known photo-printing technique so as to straddle between the strain generating areas 6 in the lower transverse beam 5d. The second and fourth strain gauges RB and RD so formed occupy respective positions immediately beneath the associated strain generating areas 6 in the lower transverse beam 5d.

Figure 7:
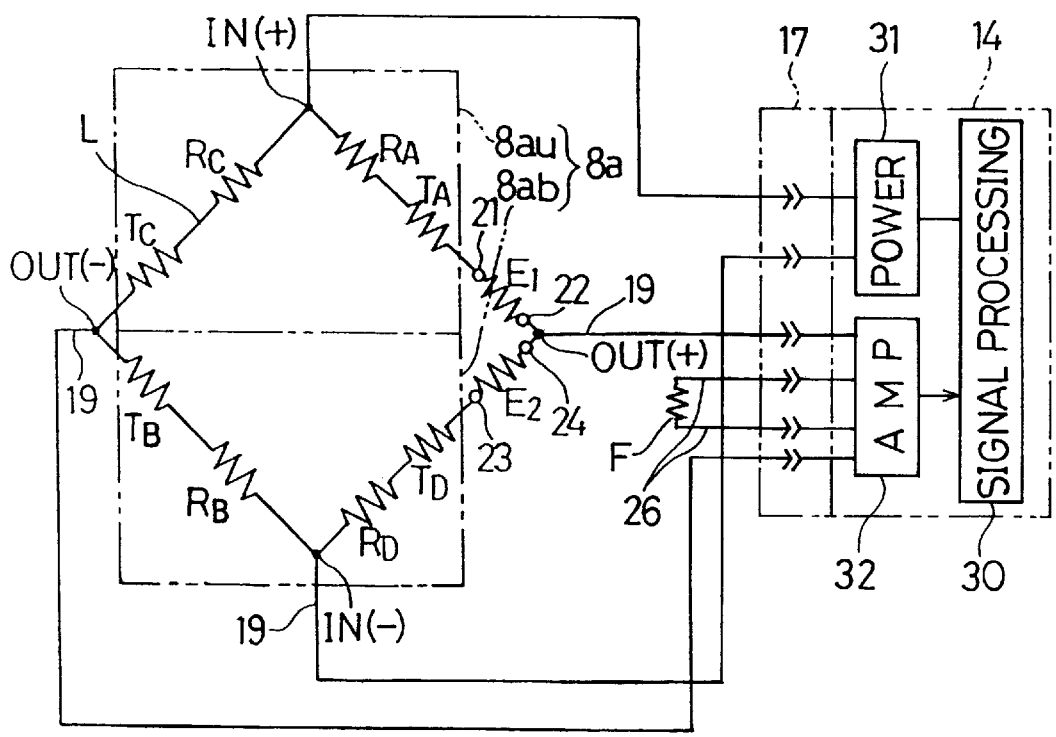
FIG. 7 is a circuit diagram showing the bridge circuit employed in the load cell shown in FIG. 5.

The bridge circuit 8 employed in the second preferred embodiment of the present invention is such as shown in FIG. 7 and is identical with that shown in FIG. 4, except that the bridge circuit 8 employed in the second preferred embodiment of the present invention includes the circuit component 8a divided into the two halves 8au and 8ab.

Left and right portions of each of the circuit portions 8au and 8ab with respect to the longitudinal direction of any one of the upper and lower transverse beams 5c and 5d are formed symmetrical 4 with respect to a point O1 or O2 intermediate between the strain generating areas 6 in the corresponding transverse beam 5c or 5d. The rest of wiring portions of the bridge circuit 8 other than the patterned circuit component 8a (i.e., circuit portions 8au and 8ab) are formed in the flexible wiring ribbon 12.

The bridge circuit 8 employed in the second preferred embodiment is of a structure such as shown in FIG. 7 which is identical with that shown in FIG. 4 as hereinbefore described. However, in view of the circuit component 8 divided into the two halves 8au and 8ab in the second preferred embodiment of the present invention, the positive input terminal IN(+) of the bridge circuit 8 is formed within the circuit portion 8au while the negative input terminal IN(−) of the bridge circuit 8 is formed within the circuit portion 8ab unlike those in the first preferred embodiment of the present invention. It is however to be noted that, as is the case with the first preferred embodiment, the positive and negative output terminals OUT(+) and OUT(−) of the bridge circuit 8 are, in the second embodiment, formed in the flexible wiring ribbon 12.

The zero-point temperature compensating elements E1 and E2 are not patterned, but are mounted as separate component parts on the top and bottom surfaces U and B of the strain inducing element 5 at respective central portions OU and OB adjacent the center points O1 and O2 of the circuit portions 8au and 8ab, respectively. Each of the zero-point temperature compensating elements E1 and E2 has its opposite ends connected through a lead line L1 with associated respective connecting terminals 21 and 22 or 23 and 24 formed in the flexible wiring ribbon 12. Similarly, a Young's modulus temperature compensating element F is, without being patterned, mounted as a separate component part on the top surface U of the strain inducing element 5 at the central portion OU and is electrically connected through a lead line L2 with a line 26 formed in the flexible wiring ribbon 12. It is to be noted that the Young's modulus temperature compensating element F may be disposed at the central portion OB of the bottom surface B or at the respective central portions OU, OB of the top and bottom surfaces U and B. The patterned circuit component 8a of the bridge circuit 8 together with the zero-point temperature compensating elements E1 and E2 and the Young's modulus temperature compensating element F is, as shown in FIG. 5, covered by a protective layer 10 of synthetic resin such as, for example, silicone for protecting them from influenced by external stresses.

Figure 8:
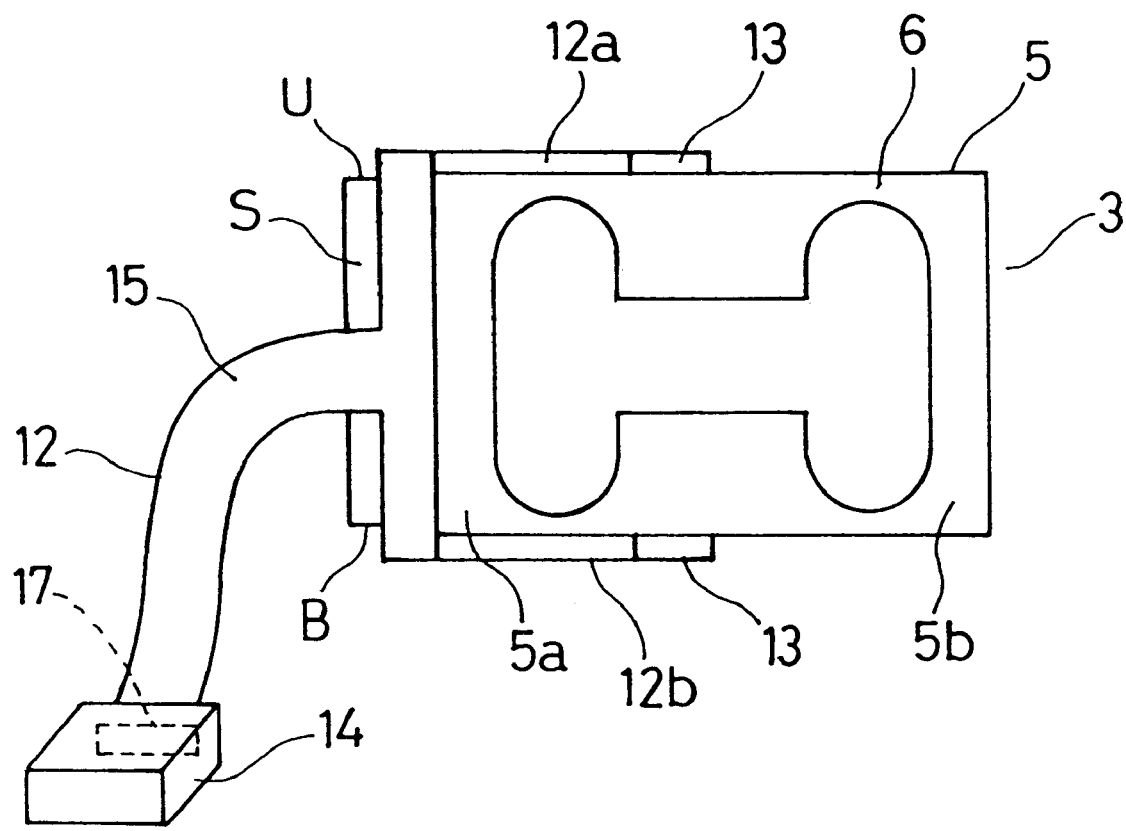
FIG. 8 is a schematic side view of the load cell shown in FIG. 5.

As shown in a front elevational representation in FIG. 8, the flexible wiring ribbon 12 when viewed from a direction shown by the arrow VIII in FIG. 5, one end portion of the flexible wiring ribbon 12 on one side of the generally intermediate portion 15 remote from the external circuit 14 is bifurcated into two ribbon branches 12a and 12b each having a free end connected to the associated patterned circuit portion 8au or 8ab. A section of the intermediate portion 15 of the flexible wiring ribbon 12 adjacent the point of bifurcation and the ribbon branches 12a and 12b are secured to a side surface S of the fixed rigid body 5a and the top and bottom surfaces U and B of the strain inducing element 5 by the use of any suitable fixing means such as, for example, a double-sided adhesive tape.

According to the second preferred embodiment of the present invention as hereinabove described, circuit portions of the bridge circuit 8 which include at least the strain gauges RA to RD and some of the connecting conductors L are patterned on the top and bottom surfaces U and B of the strain inducing element 5, respectively, to provide the load cell of a double-sided gauge system.

Specifically, the third and second strain gauges RC and RB paired on one side of the load cell 3 adjacent the fixed rigid body 5a are positioned on the bottom and top surfaces B and U in alignment with each other, respectively, and the first and fourth strain gauges RA and RD paired on the opposite side of the load cell 3 adjacent the movable rigid body 5b are positioned on the top and bottom surfaces of the strain inducing element 5 in alignment with each other, respectively. Accordingly, even though a difference in temperature develops between the fixed and movable rigid bodies 5a and 5b, a difference in temperature develops neither between the tensile and compressive strain gauges RC and RB aligned with each other adjacent the fixed rigid body 5a nor between the compressive and expansive strain gauges RA and RD aligned with each other adjacent the movable rigid body 5b. Consequently, even though a resistor of which the temperature-dependent coefficient of resistance (TCR) is not strictly zero is employed for each of the first to fourth strain gauges RA to RD, a change in resistance due to the temperature difference is equal in each stain gauge pair since the temperature difference in each pair is small.

With the bridge circuit 8 so designed as shown in FIG. 7, once a difference occurs in resistance between the compressive strain gauge RA or RB and the tensile strain gauge RD or RC forming the respective pair as a result of development of the temperature difference, an error immediately occurs in the output voltage between the output terminals OUT(+) and OUT(-), bringing the bridge circuit 8 into a state of imbalance. Accordingly, elimination of the difference in temperature between the strain gauges of each pair accomplished in the manner as hereinabove described is effective to allow the bridge circuit 8 to maintain a state of equilibrium to thereby accomplish a highly precise and accurate weighing.

Although the present invention has been fully described in connection with the preferred embodiments thereof with reference to the accompanying drawings which are used only for the purpose of illustration, those skilled in the art will readily conceive numerous changes and modifications within the framework of obviousness upon the reading of the specification herein presented of the present invention. For example, although in any one of the foregoing embodiments of the present invention, the intermediate portion 15 of the flexible wiring ribbon 12 has been shown and described as secured to the side surface S and top or bottom surfaces U or B of the fixed rigid body 5a of the strain inducing element 5, it may not be secured to the side surface S and may be secured merely to the top or bottom surface U or B of the fixed rigid body 5a.

Also, only a portion of the bridge circuit 8, that is, the circuit component 8a, has been described as formed by a patterning technique. However, the bridge circuit 8 in its entirety may be formed by the patterning technique. Yet, if one or both of the weighing table 2 and the base support 4 is of a type which does not bring about a considerable temperature change, the use of the heat insulating pads 18 disposed at the left and right ends of the strain inducing element 5 may be dispensed with.

Also, the weighing apparatus to which the present invention is applicable may include a combinational weighing apparatus of a type wherein a plurality of weighing devices, each having a weighing hopper forming the weighing table 2 and fitted to the movable rigid body of the load cell, are mounted on the base support 4.

Accordingly, such changes and modifications are, unless they depart from the scope of the present invention as delivered from the claims annexed hereto, to be construed as included therein.

What is claimed is:

1. A weighing apparatus which comprises:
   a strain inducing element including a fixed rigid body, a movable rigid body to be loaded, a plurality of transverse beams to connect said fixed and movable rigid bodies together, said fixed and movable rigid bodies being arranged in right and left portions of said strain inducing element, and said plurality of transverse beams being spaced one above the other, each of said transverse beams having first and second strain generating areas defined therein in spaced relation to each other at respective locations adjacent said fixed and movable rigid bodies, said strain inducing element being of a shape symmetrical with respect to a mid center plane dividing the strain inducing element into left and right halves;
   a bridge circuit to output a load signal of a magnitude proportional to strains generated at said strain generating areas;
   said bridge circuit including strain gauges to detect the strains generated at the strain generating areas, adjusting elements to adjust a balance of the bridge circuit, and lines connecting them together; and
   a circuit portion of the bridge circuit which includes at least said strain gauge and some of the lines being formed in a predetermined pattern on one surface of the strain inducing element so as to straddle between the first and second strain generating areas, said predetermined pattern being symmetrical with respect to a point intermediate between the first and second strain generating areas;

wherein said bridge circuit also includes a zero-point temperature compensating element to compensate for changes in a zero-point of the bridge circuit with a change in temperature, said zero-point temperature compensating element being disposed at a location adjacent said intermediate point, wherein said weighing apparatus further comprises a base support to support the fixed rigid body of the load cell, a weighing table coupled with the movable rigid body of the load cell to support an object thereon to be weighed, and a heat insulating material interposed between the fixed rigid body and the base support and also between the movable rigid body and the weighing table so as to minimize heat transfer by thermal conduction from the base support and the weighing table to the strain inducing element thereby creating no temperature difference between the strain gauges adjacent the fixed rigid body and the strain gauges adjacent the movable rigid body, sid heat insulating material being a rigid material.

2. The load cell as claimed in claim 1, wherein said adjusting elements are formed in a predetermined pattern on the surface of the strain inducing element together with the strain gauges.

3. The load cell as claimed in claim 1, further comprising a Young's modulus temperature compensating element for compensating for change in Young's modulus of elasticity of the strain inducing element with change in temperature, said Young's modulus temperature compensating element being disposed at a location adjacent said intermediate point.

4. The load cell as claimed in claim 1, wherein said circuit portion of the bridge circuit which includes at least said strain gauge and some of the lines is formed in a predetermined pattern on each of top and bottom surfaces of the strain inducing element.

5. A weighing apparatus which comprises:

a strain inducing element including a fixed rigid body, a movable rigid body to be loaded, a plurality of transverse beams spaced one above the other and connecting the fixed and movable rigid bodies together, each of said transverse beams having first and second strain generating areas defined therein in spaced relation to each other at respective locations adjacent the fixed and movable rigid bodies;

a bridge circuit to output a load signal of a magnitude proportional to strains generated at said strain generating areas;

said bridge circuit including strain gauges to detect the strains generated at the strain generating areas;

adjusting elements to adjust a balance of the bridge circuit, and lines connecting them together;

a circuit portion of the bridge circuit which includes at least said strain gauge and some of the lines being formed in a predetermined pattern on one surface of the strain inducing element so as to straddle between the first and second strain generating areas;

a flexible wiring ribbon forming a non-patterned portion of the bridge circuit, which is not formed on such surface of the strain inducing element and lines to connect the bridge circuit with an external circuit; and said flexible wiring ribbon having first and second connecting ends opposite to each other, said first connecting end of said flexible wiring ribbon being connected with a patterned portion of the bridge circuit, which is formed on such surface of the strain inducing element, at a location generally intermediate between the first and second strain generating areas, said second connecting end of said flexible wiring ribbon being adapted to be connected with the external circuit, a portion of said flexible wiring ribbon generally intermediate between said first and second connecting ends thereof being supported by the fixed rigid body of the strain inducing element;

wherein said bridge circuit also includes a zero-point temperature compensating element to compensate for changes in a zero-point of the bridge circuit with a change in temperature, said zero-point temperature compensating element being disposed at a location adjacent said intermediate point and electrically connected with associated lines formed on the flexible wiring ribbon, wherein the weighing apparatus further comprises a base support to support the fixed rigid body of the load cell, a weighing table coupled with the movable rigid body of the load cell to support an object thereon to be weighed, and a heat insulating material interposed between the fixed rigid body and the base support and also between the movable rigid body and the weighing table so as to minimize heat transfer by thermal conduction from the base support and the weighing table to the strain inducing element thereby creating no temperature difference between the strain gauges adjacent the fixed rigid body and the strain gauges adjacent the movable rigid body, said heat insulating material being a rigid material.

6. The load cell as claimed in claim 5, wherein said adjusting elements are formed in a predetermined pattern on the surface of the strain inducing element together with the strain gauges.

7. The load cell as claimed in claim 5, further comprising a Young's modulus temperature compensating element for compensating for change in Young's modulus of elasticity of the strain inducing element with change in temperature, said Young's modulus temperature compensating element being disposed at a location adjacent said intermediate point and electrically connected with one of lines formed on the flexible wiring ribbon.

8. The load cell as claimed in claim 5, wherein said circuit portion of the bridge circuit which includes at least said strain gauge and some of the lines is formed in a predetermined pattern on each of top and bottom surfaces of the strain inducing element.

* * * * *